(12) United States Patent
Bessho

(10) Patent No.: US 11,323,895 B2
(45) Date of Patent: May 3, 2022

(54) IN-VEHICLE COMMUNICATION DEVICE

(71) Applicant: TOYOTA JIDOSHA KABUSHIKI KAISHA, Toyota (JP)

(72) Inventor: Katsuhiko Bessho, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

(21) Appl. No.: 16/856,166

(22) Filed: Apr. 23, 2020

(65) Prior Publication Data
US 2021/0037401 A1 Feb. 4, 2021

(30) Foreign Application Priority Data

Jul. 30, 2019 (JP) .............................. JP2019-139788

(51) Int. Cl.
*H04W 24/04* (2009.01)
*H04W 4/40* (2018.01)

(52) U.S. Cl.
CPC ............. *H04W 24/04* (2013.01); *H04W 4/40* (2018.02)

(58) Field of Classification Search
None
See application file for complete search history.

(56) References Cited

U.S. PATENT DOCUMENTS

| 10,159,088 | B1 * | 12/2018 | De Nagy Koves Hrabar ............. H04W 40/04 |
| 2004/0203918 | A1 * | 10/2004 | Moriguchi ............. G01C 21/26 455/456.1 |
| 2008/0151817 | A1 * | 6/2008 | Fitchett ................. H04W 28/20 370/329 |
| 2015/0249948 | A1 * | 9/2015 | Yamamoto ............ H04W 36/24 455/441 |
| 2017/0146429 | A1 * | 5/2017 | Suzuki .................. G01M 13/04 |
| 2018/0231977 | A1 | 8/2018 | Uno |
| 2019/0270478 | A1 * | 9/2019 | Kim ...................... B62D 15/025 |
| 2020/0314608 | A1 * | 10/2020 | Harada ................. H04W 24/04 |
| 2021/0083955 | A1 * | 3/2021 | Kanaya ................. H04L 43/065 |

FOREIGN PATENT DOCUMENTS

| JP | 2018-132985 A | 8/2018 |
| JP | 2018-198004 A | 12/2018 |

\* cited by examiner

Primary Examiner — Rebecca E Song
(74) Attorney, Agent, or Firm — Oliff PLC

(57) ABSTRACT

A communication device is provided in a vehicle and is configured to communicate with an external center. The communication device includes a collection unit configured to collect data to be transmitted to the center, a communication unit configured to transmit the data collected by the collection unit to the center, a prediction unit configured to predict an occurrence of communication interruption between the center and the communication unit based on predetermined information, and a controller configured to cause the communication unit to stop transmitting the data in a case where the prediction unit predicts that a predicted time from a current time to the occurrence of communication interruption is less than a first predetermined time.

4 Claims, 2 Drawing Sheets

IN-VEHICLE COMMUNICATION DEVICE

INCORPORATION BY REFERENCE

The disclosure of Japanese Patent Application No. 2019-139788 filed on Jul. 30, 2019 including the specification, drawings and abstract is incorporated herein by reference in its entirety.

BACKGROUND

1. Technical Field

The disclosure relates to a communication device mounted on a vehicle or the like.

2. Description of Related Art

It has become common for a center outside a vehicle to provide various services to the vehicle. In such a service, for example, the vehicle wirelessly transmits a state, such as a position or a speed of a host vehicle, or information, such as an obstacle on a road surface, to the center, and the center generates information for avoiding a congestion or achieving safer traveling based on information collected from the vehicle or other vehicles, and wirelessly transmits the information to the vehicle.

Various techniques have been proposed for communication between the vehicle and the center. Japanese Unexamined Patent Application Publication No. 2018-198004 (JP 2018-198004 A) discloses that in a case where information on a presence or absence of an obstacle on a traveling road received from a center does not match information on a presence or absence of an obstacle obtained by imaging a traveling road by a drive recorder of a vehicle, imaging data is transmitted to a center server. In this way, a communication amount or a bandwidth used for communication can be saved by transmitting solely data that is useful for updating a dynamic database by the center server to the center server.

Japanese Unexamined Patent Application Publication No. 2018-132985 (JP 2018-132985 A) discloses that a vehicle specifies a communication established section where communication with a center is established and a communication interrupted section where communication with the center is interrupted on a scheduled traveling route by receiving a communication actual result by a preceding vehicle from the center, and the vehicle enables a system-driven driving, such as autonomous driving, by using road condition information received from the center when traveling in the communication established section, and switches to a driver-driven driving like a manual driving when traveling in the communication interrupted section. In this way, an influence on driving control can be suppressed by restricting the system-driven driving when communication is interrupted.

SUMMARY

There may be places where a communication environment with the center is not suitable, such as an inside of a tunnel or underground. In a case where communication with the center is interrupted in such a place, as processing performed by a communication device mounted on the vehicle, for example, it is conceivable to periodically try to transmit data to the center or receive data from the center. However, when such processing is blindly repeated, a resource (processing capability) or a power of the communication device or other in-vehicle devices of the vehicle is wastefully consumed.

The disclosure provides a communication device that suppresses waste of a resource or a power when communication with a center is interrupted.

An aspect of the disclosure relates to a communication device that is provided in a vehicle and is configured to communicate with an external center. The communication device includes a collection unit, a communication unit, a prediction unit, and a controller. The collection unit is configured to collect data to be transmitted to the center. The communication unit is configured to transmit the data collected by the collection unit to the center. The prediction unit is configured to predict an occurrence of communication interruption between the center and the communication unit based on predetermined information. The controller is configured to cause the communication unit to stop transmitting the data in a case where the prediction unit predicts that a predicted time from a current time to the occurrence of communication interruption is less than a first predetermined time.

According to the aspect of the disclosure, it is possible to provide a communication device that suppresses waste of a resource or a power by suppressing communication when communication with the center is interrupted.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A communication device according to an aspect of the disclosure predicts a period during which communication with a center is interrupted, and suppresses communication during the communication interruption period. With this, it is possible to suppress wasteful consumption of a resource (processing capability) or a power of the communication device or other in-vehicle devices of a vehicle.

Embodiment

Hereinafter, an embodiment of the disclosure will be described in detail with reference to the drawings.

Configuration

Figure 1:
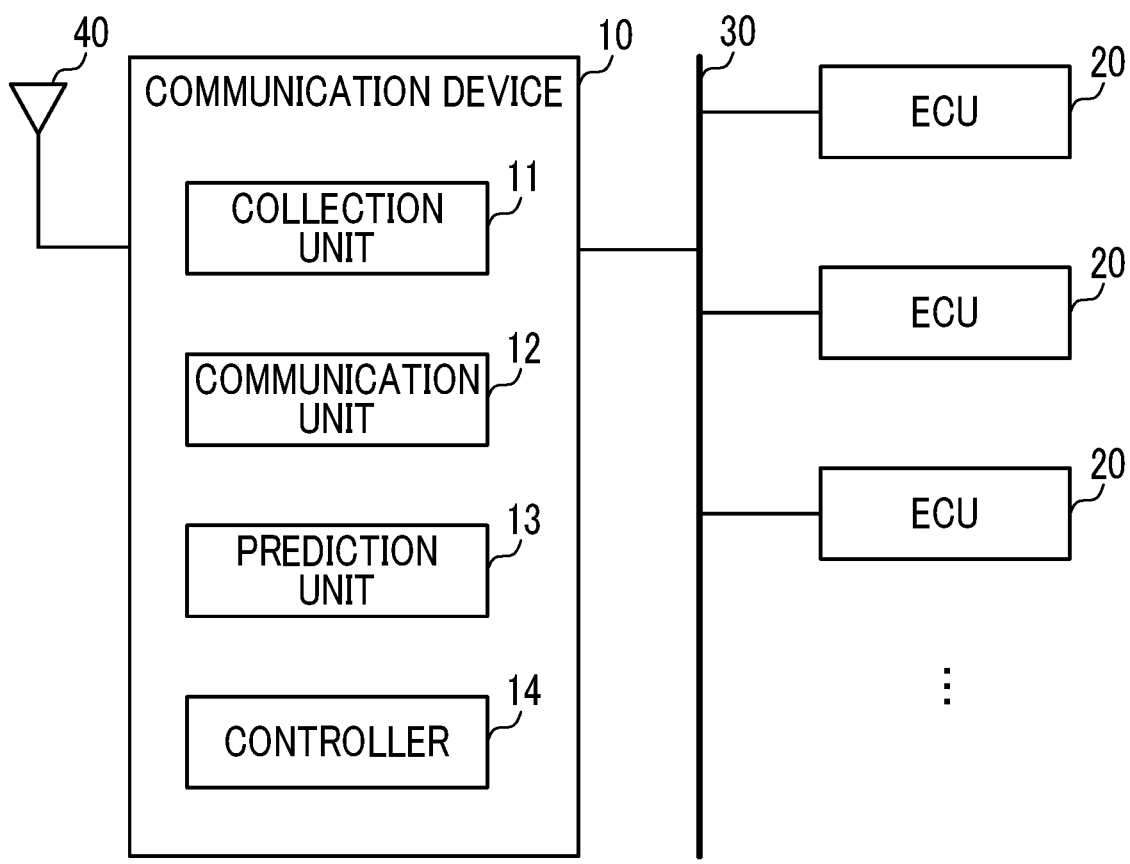
FIG. 1 is a configuration diagram of a communication device and peripheral devices according to an embodiment of the disclosure.

FIG. 1 shows a configuration diagram of a communication device 10 and peripheral devices according to the embodiment. The communication device 10 and a plurality of electronic control units (ECUs) 20 are connected with each other through a bus 30 to form an in-vehicle network system. The ECUs 20 share and execute processing, such as driving control of the vehicle, and transmit and receive data needed for the processing to and from each other.

The communication device 10 can wirelessly communicate with a communication device or the like provided at a center outside the vehicle through an antenna 40, and can transmit and receive various kinds of data to and from the center. Each of the ECUs 20 can provide the center with data indicating a control state or a traveling road state of the vehicle generated by the ECU 20, or receive data from the center and use the data for various controls via the communication device 10.

The communication device 10 includes a collection unit 11, a communication unit 12, a prediction unit 13, and a controller 14. The collection unit 11 discriminates and collects data to be transmitted to the center based on, for example, an identifier assigned to data or a content of a data body, among pieces of data flowing through the bus 30. The communication unit 12 appropriately encodes and modulates data to be transmitted, converts the data into a transmission signal, and transmits the transmission signal to the center through the antenna 40 (data transmission), or appropriately demodulates and decodes a reception signal received from the center through the antenna 40, converts the reception signal into data, and delivers the data to the bus 30 (data reception). The prediction unit 13 can predict a timing of an occurrence or a resolution of the communication interruption between the center and the communication device 10 based on predetermined information as described below. The controller 14 controls operations of the collection unit 11, the communication unit 12, the prediction unit 13, and the like. The implementation form of the functions of these units is not limited, and the functions may not be intensively implemented as one communication device 10, for example, may be distributed and implemented in two or more devices on an in-vehicle network system.

Processing

Figure 2:
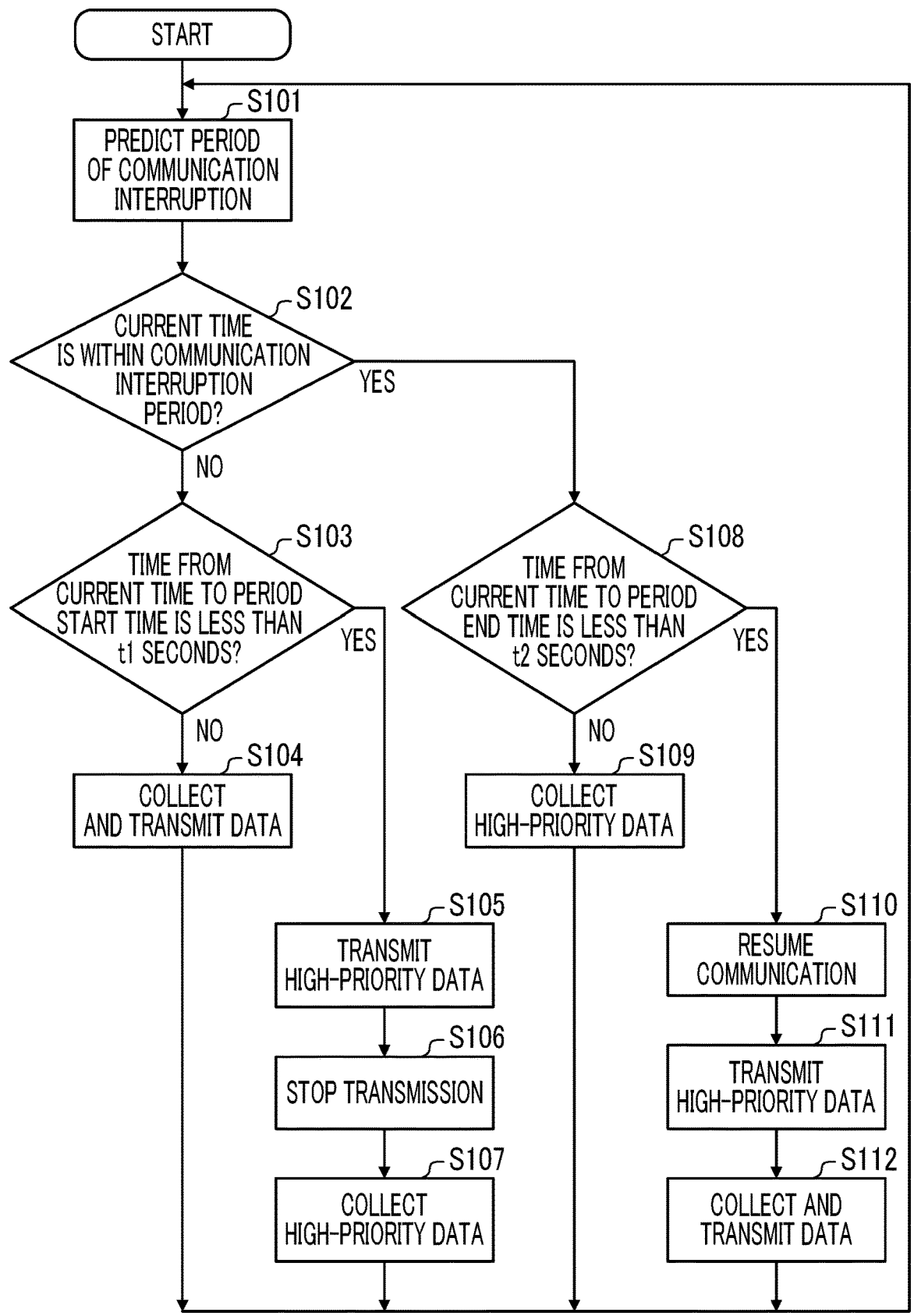
FIG. 2 is a flowchart showing processing of the communication device according to the embodiment of the disclosure.

Hereinafter, data transmission control processing performed by the communication device 10 according to the embodiment will be described with reference to a flowchart of FIG. 2. This processing is started, for example, when a power of the vehicle is turned on and the network system is activated, and execution is continued during the activation. In parallel with this processing, the communication device 10 can appropriately receive data from the center.

(Step S101): The prediction unit 13 predicts a communication interruption period, which is a period from an occurrence of communication interruption with the center to a resolution thereof. While a prediction method is not limited, the method can be broadly classified into, for example, a method using a preset traveling route as a scheduled traveling route in an in-vehicle navigation system and a method not using a preset traveling route.

An example of the method using the preset traveling route will be described. In this example, the prediction unit 13 derives, based on a current position and speed of a vehicle, a traveling route on a map, and a communication cover area information which is predetermined information indicating an area where communication with the center is possible and an area where communication with the center is not possible in a predetermined region, a time at which the vehicle moves from an area where communication is possible to an area where communication is not possible and a time at which the vehicle moves from an area where communication is not possible to an area where communication is possible in a case where the vehicle moves along the traveling route, thereby predicting a communication interruption period. This method can be used when the traveling route is set in the in-vehicle navigation system, and prediction can be made even in a relatively long traveling time as long as the vehicle travels along the traveling route.

An example of the method not using the preset traveling route will be described. In this example, the prediction unit 13 derives, based on a current position and speed of a vehicle, information for specifying a road on which the vehicle is currently traveling on a map, and a communication cover area information, a time at which the vehicle moves from an area where communication is possible to an area where communication is not possible and a time at which the vehicle moves from an area where communication is not possible to an area where communication is possible in a case where the vehicle moves along the road on which the vehicle is currently traveling, thereby predicting a communication interruption period. This method can be used even when the traveling route is not set in the in-vehicle navigation system, but prediction can be made solely within a relatively short traveling time while the vehicle is traveling on the road. However, in this method, for example, when it is detected that the vehicle turns at an intersection or the like and the road on which the vehicle is traveling is changed based on a steering angle of a steering wheel, and prediction is updated based on the changed road, prediction can be made even in a long traveling time.

In any of the above-described methods, the information needed for prediction can be acquired by the prediction unit 13 from any of the ECUs 20. The communication cover area information may be stored in the prediction unit 13 or any of the ECUs 20 in advance, or may be received from the center when wireless communication with the center is possible. In addition, both of the above methods may be combined. For example, in a case where a user sets the traveling route in the in-vehicle navigation system, it takes time until the in-vehicle navigation system resets the traveling route when the vehicle deviates from the traveling route. Therefore, for example, when the prediction unit 13 performs prediction based on the set traveling route while the vehicle is traveling on the set traveling route, and performs prediction based on the road on which the vehicle is actually traveling until the traveling route is reset after the vehicle deviates from the traveling route, highly accurate prediction is always possible.

(Step S102): The controller 14 determines whether or not current time is within the communication interruption period. The controller 14 can determine that the current time is within the communication interruption period when the current time is after a predicted start time and before a predicted end time of the communication interruption period. In a case where the current time is not within the communication interruption period, the processing proceeds to step S103. In a case where the current time is within the communication interruption period, the processing proceeds to step S108.

(Step S103): The controller 14 determines whether or not a time from the current time to a predicted start time of a next communication interruption period is less than a first predetermined time (t1 seconds). In a case where the time from the current time to the predicted start time is less than the first predetermined time, the processing proceeds to step S105. In a case where the time is not less than the first predetermined time, the processing proceeds to step S104.

(Step S104): The controller 14 executes data transmission to the center. That is, the controller 14 causes the collection unit 11 to sequentially collect data to be transmitted to the center from pieces of data flowing through the bus 30. The controller 14 causes the communication unit 12 to acquire the data collected by the collection unit 11 and sequentially transmit the data. In this step, since the current time is not within the communication interruption period and the time from the current time to the start of communication interruption is the first predetermined time or more, it is considered that a communicable time is sufficient, and such normal data transmission is performed. The processing proceeds to step S101 in a state where such data collection and transmission are continued.

(Step S105): The controller 14 executes data transmission to the center solely for high-priority data. That is, in a case where there is untransmitted data among pieces of data collected by the collection unit 11 so far, the controller 14 causes the communication unit 12 to transmit solely high-priority data. The high-priority data is, for example, data used for providing a service by the center, or data with high urgency, such as notification of an accident occurrence. In addition, for example, data for testing or reference collected by the center for a future service, which is not used for providing a service, is low-priority data. Discrimination of such high-priority data can be made based on an identifier assigned to data, a content of a data body, or the like. In this step, while the current time is not within the communication interruption period, the time from the current time to the start of communication interruption is less than the first predetermined time. Thus, it is considered that a communicable time is not sufficient, and data transmission limited to such high-priority data is performed. It is desired that the first predetermined time is set to a time during which solely untransmitted high-priority data before the start of communication interruption can be transmitted according to the amount of communication data or a communication speed between the communication device 10 and the center. In a case where the amount of high-priority data that has not yet been transmitted is too large to transmit all within the first predetermined time, for example, the amount of data that can be transmitted may be transmitted.

(Step S106): The controller 14 causes the communication unit 12 to stop a communication function related to data transmission and reception.

(Step S107): The controller 14 causes the collection unit 11 to sequentially collect high-priority data as data to be transmitted to the center from pieces of data flowing through the bus 30. The processing proceeds to step S101 in a state where such high-priority data collection is continued.

(Step S108): The controller 14 determines whether or not a time from the current time to the predicted end time of the communication interruption period is less than a second predetermined time (t2 seconds). In a case where the time from the current time to the predicted end time is less than the second predetermined time, the processing proceeds to step S110. In a case where the time is not less than the second predetermined time, the processing proceeds to step S109.

(Step S109): The controller 14 causes the collection unit 11 to sequentially collect high-priority data as data to be transmitted to the center from pieces of data flowing through the bus 30. In this step, since the current time is within the communication interruption period and the time from the current time to the end of communication interruption is the second predetermined time or more, it is considered that data transmission is not possible for the time being, and solely the collection of high-priority data is continued from step S107, and data transmission is suppressed. The processing proceeds to step S101 in a state where such high-priority data collection is continued.

(Step S110): The controller 14 causes the communication unit 12 to resume the communication function. In this step, since the current time is within the communication interruption period and the time from the current time to the end of communication interruption is less than the second predetermined time, it is considered that data transmission is to be possible before long, and the communication function is resumed. It is desired that the second predetermined time is set such that a time at which data can be transmitted is immediately after the end of the communication interruption period according to a time needed for the communication device 10 to resume communication or the like.

(Step S111): The controller 14 causes the communication unit 12 to acquire the high-priority data collected by the collection unit 11 in step S107 and step S109 and transmit the data to the center. In addition, in a case where there is any high-priority data collected by the collection unit 11 in step S104 that could not be transmitted in step S105, the controller 14 may cause the communication unit 12 to transmit the data to the center.

(Step S112): The controller 14 resumes normal data transmission to the center as in step S104. That is, the controller 14 causes the collection unit 11 to sequentially collect data to be transmitted to the center from pieces of data flowing through the bus 30. The controller 14 causes the communication unit 12 to acquire the data collected by the collection unit 11 and sequentially transmit the data. The processing proceeds to step S101 in a state where such data collection and transmission are continued.

Effect

According to the embodiment, a period during which communication with a center is interrupted is predicted, and communication is suppressed during the communication interruption period. Solely high-priority data is collected during the communication interruption period. With these, it is possible to suppress wasteful consumption of a resource (processing capability) or a power of a communication device or another in-vehicle device of a vehicle.

Immediately before or immediately after the communication interruption period, high-priority data is transmitted preferentially, so that communication with reduced influence on service quality or the like due to communication interruption is possible.

The prediction unit 13 can predict the communication interruption period even without using a preset traveling route. Therefore, even in a case where a user uses a navigation service provided by a portable terminal that has become widespread in recent years and does not set the traveling route in the in-vehicle navigation system, the communication interruption period can be predicted.

Modification Example

Steps S107, S109, and S111 described above may be omitted, and collection of high-priority data during the communication interruption period and transmission after the communication interruption period may not be performed. In this case, a resource of the collection unit 11 or the like can be further saved.

Alternatively, in steps S107 and S109, the controller 14 may cause the collection unit 11 to collect other data as well as high-priority data during the communication interruption period, and in step S111, the controller 14 may cause the communication unit 12 to transmit all pieces of data collected after the communication interruption period. Even in this case, communication is suppressed, so that a resource or a power can be saved to a certain extent.

In step S104, the controller 14 may cause the communication unit 12 to transmit the communication interruption period predicted by the prediction unit 13 in step S101 to the center. With this, the center can also recognize the communication interruption period, so that the center can appropriately change a content or a transmission timing of the data addressed to the vehicle and improve a service quality in response to communication interruption.

The controller 14 may cause the communication unit 12 to try communication with the center during the communication interruption period. Even in this case, when a frequency of trials is appropriately low, it is possible to save a resource or a power to a certain extent. In a case where communication is possible, the processing may proceed to step S110 to resume communication, and the processing may proceed assuming that the current time is outside the communication interruption period. With this, in a case where communication is possible against a content of the communication cover area information due to a temporary improvement of a communication environment or the like, communication can be resumed at an early stage.

In a case where communication interruption is detected, for example, due to a predetermined number of consecutive failures in data transmission even though not within the communication interruption period, the controller 14 may proceed to step S106 to cause the communication unit 12 to suppress communication, and proceed with the processing assuming that the current time is within the communication interruption period. In this case, after that, when the communication with the center is tried at a low frequency to enable communication, the processing proceeds to step S110 to resume communication, and it is assumed that the current time is outside the communication interruption period. With this, even in a case where communication is not possible against a content of the communication cover area information due to a temporary malfunction of a communication environment or the like, a resource or a power can be saved to a certain extent.

The disclosure can be understood as a network system including a communication device, a control method of the communication device, a control program of the communication device executed by an ECU including a processor and a memory, a non-transitory computer-readable storage medium storing the program, a vehicle including the communication device or the network system, and the like, as well as the communication device. The disclosure can be applied to a communication device other than the communication device mounted on the vehicle.

The disclosure is useful for the communication device mounted on the vehicle or the like.

What is claimed is:

1. A communication device that is provided in a vehicle and is configured to communicate with an external center, the communication device comprising:
a processor and memory programmed to:
collect data to be transmitted to the center;
transmit the data to the center;
predict an occurrence of communication interruption between the center and the communication device based on predetermined information and stop transmitting the data in a case where the communication device predicts that a predicted time from a current time to the occurrence of communication interruption is less than a first predetermined time,
predict a resolution of communication interruption between the center and the communication device based on information for specifying whether or not communication with the center is possible, and in a case where it is determined that a predicted time from a current time to the resolution of communication interruption is less than a second predetermined time while the communication device stops transmitting the data, the communication device is programmed to resume transmitting the data; and
collect at least high-priority data while the communication device stops transmitting the data and when transmitting the data is resumed, the communication device is programmed to transmit the collected high-priority data.

2. The communication device according to claim 1, wherein the processor is configured to, in a case where the processor predicts that communication interruption occurs within the first predetermined time, cause the processor to transmit high-priority data among pieces of data collected before the communication device stops transmitting the data.

3. The communication device according to claim 1, wherein the predetermined information includes information indicating a preset traveling route and information indicating whether or not communication is possible at each point within a predetermined range around the vehicle.

4. The communication device according to claim 1, wherein the predetermined information includes a steering angle of a steering wheel and information indicating whether or not communication is possible at each point within a predetermined range around the vehicle.

* * * * *